United States Patent [19]

Izumi et al.

[11] Patent Number: 4,849,730

[45] Date of Patent: Jul. 18, 1989

[54] FORCE DETECTING DEVICE

[75] Inventors: Kouji Izumi, Yokohama; Masanori Itagaki, Tokyo; Eiichi Ohta, Yokohama; Hiroyuki Okamoto, Sagamihara; Masumitsu Ino; Hirotoshi Equchi, both of Yokohama, all of Japan

[73] Assignee: Ricoh Company, Ltd., Tokyo, Japan

[21] Appl. No.: 15,370

[22] Filed: Feb. 17, 1987

[30] Foreign Application Priority Data

Feb. 14, 1986 [JP] Japan .................. 61-029957
Jul. 4, 1986 [JP] Japan .................. 61-157521

[51] Int. Cl.⁴ .......................................... G01L 1/22
[52] U.S. Cl. ............................... 338/2; 338/5
[58] Field of Search ............................ 338/2-5; 29/610 SG; 73/727

[56] References Cited

U.S. PATENT DOCUMENTS

4,689,600 8/1987 Wilner .................................. 338/5

Primary Examiner—E. A. Goldberg
Assistant Examiner—M. M. Lateef
Attorney, Agent, or Firm—Oblon, Spivak, McClelland, Maier & Neustadt

[57] ABSTRACT

A force detecting device includes an insulative strain element, strain sensors, and leads. The insulative strain element is electrically insulative at least at its surface. The strain sensors are formed of a piezoresistive thin film and deposited as a piezoresistive thin film pattern on the surface of the insulative strain element integrally therewith. The leads are formed of a highly conductive thin film and deposited as a highly conductive thin film pattern on the surface of the insulative strain element integrally therewith.

8 Claims, 5 Drawing Sheets

FIG. 3 (III)

FORCE DETECTING DEVICE

BACKGROUND OF THE INVENTION

1. Field of the Invention

The present invention relates generally to a force detecting device, and more particularly to a force detecting device known as a force transducer.

2. Discussion of Background

Some force detecting devices employ an elastic member called a strain element for detecting a force or moment applied to the elastic member based the elastic deformation of the elastic member. Such force detecting devices are known in respect of the wrist sensors of industrial robots, load measuring devices, steering devices, operating devices, and other devices. Various designs have been proposed for force detecting devices.

Forces or moments are electrically detected by force detecting devices. More specifically, a resistance strain sensor is attached to a surface of a strain element. When the strain element is elastically deformed under a force or moment applied, the strain sensor is also deformed with the strain element, changing its electric resistance. By electrically detecting such a change in the electric resistance, the amount of deformation of the strain element is determined, and hence the force or moment imposed on the strain element is known from the amount the strain element is deformed.

Conventional attempts to improve known force detecting devices or sensors are generally classified into two groups. In one group, efforts are made to increase the accuracy of detection. The other attempts are to facilitate the manufacture of the force detecting devices.

The detecting accuracy of a force detecting device is determined by the gage factor thereof. The gage factor G of a force sensor is defined by:

$$G = \frac{\Delta R/R}{\Delta L/L}$$

where R and L are the resistance and length, respectively, of the strain sensor of the force detecting device, and $\Delta R$ is a change in the resistance which is caused when the length L is changed $\Delta L$. $\Delta L/L$ here means a ratio of change, i.e., a strain (expressed by $\epsilon$). For the strain sensors used in force detecting devices, $\epsilon$ varies in the range of $10^{-5}$ to $10^{-3}$. The gage factor G governs the relationship between the amount of deformation of the strain sensor and the change in the resistance which depends on the deformation. Naturally, the larger the gage factor G, the higher the force detecting accuracy becomes, or the more accurately the force can be detected. As the force detecting sensitivity is increased, the strain element may be of a more rigid and compact structure.

Japanese Laid-Open Patent Publications Nos. 58-118930, 59-75104, and 59-231431 disclose force detecting devices which employ a metal foil strain sensor as the strain sensor. The detecting accuracy of the metal foil strain sensor cannot be increased since the gage factor is of a quite low value such as 2 or 3 because the resistivity $\rho$ of metal is not varied by deformation.

Methods for manufacturing force detecting devices are shown in Japanese Utility Model Publications Nos. 54-11903, 54-21021 and Japanese Laid-Open Patent Publication No. 59-95433. According to the disclosed methods, a strain element and a strain sensor are separately fabricated, and the strain sensor is bonded to a surface of the strain element. However, it is tedious and time-consuming to bond and wire the strain sensor, with the result that the force detecting device may not necessarily be easy to manufacture. Another problem with these manufacturing methods is that the detecting accuracy varies from device to device because it depends on the accuracy of the position where the strain sensor is bonded, the type of the adhesive used, the wiring accuracy, and other factors.

One way of increasing the detecting accuracy of a strain sensor would be to construct a strain sensor of a single-crystal semiconductor. A strain sensor constructed of a single-crystal semiconductor would be of a high detecting accuracy since the gage factor G would be around $10^2$. However, the gage factor G of such a strain sensor would be highly dependent on temperature, thus requiring a temperature compensation circuit for stable detection of forces. Inasmuch as the gage factor is not linearly proportional to temperature, a linearizer would be needed for making the gage factor linearly dependent on temperature.

SUMMARY OF THE INVENTION

In view of the aforesaid drawbacks of the conventional force detecting devices, it is an object of the present invention to provide a force detecting device which can easily be manufactured, has a high degree of detecting accuracy, and is of a rigid and compact structure.

A force detecting device according to the present invention comprises an insulative strain element, strain sensors, and wiring leads. The present invention has the following two features:

First, the strain sensors and the wiring leads are formed as thin film patterns on the insulative strain element integrally therewith. Secondly, the strain sensors are formed of a piezoresistive thin film and the leads are formed of a highly conductive thin film.

More specifically, patterns including the strain sensors and the leads are formed on the insulative strain element by thin film technology. The force detecting device can therefore be manufactured much more simply and accurately than conventional force detecting devices in which strain sensors are bonded.

The piezoresistive thin film of which the strain sensors are formed is advantageous in that the resistance thereof varies dependent on strain with good linearity, the gage factor G has low temperature dependency, and varies with time at a low rate. The gage factor G is one order of magnitude higher than that of metallic strain sensors. Therefore, the force detecting device has a detecting accuracy which is one order of magnitude higher than that of a force detecting device using conventional metal foil strain sensors. The strain element may thus be so much more compact.

The piezoresistive thin film may be made of a material such as amorphous silicon (a-Si), microcrystal silicon ($\mu$c-Si), polysilicon (poly-Si), amorphous germanium (a-Ge), microcrystal germanium ($\mu$c-Ge), or an amorphous silicon alloy.

The insulative strain element is electrically insulative at least at its surface. Therefore, the insulative strain element may comprise a metallic structural body coated with an electrically insulative material, or a metallic structural body which is electrically insulated at its surface. Alternatively, the strain element may wholly be formed of an electrically insulative material.

Where the strain element is formed in its entirety of an electrically insulative material, ceramics are quite suitable for use as such an electrically insulative material. More specifically, ceramics have a sufficient Young's modulus required by a strain element. For example, comparison between aluminum as a metallic material and alumina as a ceramic material shows that the Young's modulus of aluminum is $0.41 \times 10^6$ kg/cm$^2$ whereas the Young's modulus of alumina is $3.5 \times 10^6$ kg/cm$^2$, indicating that alumina can well be used as a strain element material. Since ceramics has a smaller coefficient of thermal expansion and a smaller thermal conductivity than those of metals, a force detecting device which is less subject to heat can be achieved by constructing the strain element of ceramics.

An insulative strain element can be formed of ceramics by sintering. Since a strain element is shaped by a mold, machining such as cutting of the formed strain element is substantially eliminated or simplified, and there is no insulation needed on the strain element. Accordingly, the process of manufacturing the force detecting device can largely facilitated by making the insulative strain element of ceramics.

Materials to be sintered may generally be metal oxides such as $Al_2O_3$ (alumina), $MgO_2$ (magnesia), and $ZrO$ (zirconia), for example. At any rate, a highly pure ceramic material must be employed.

If a ceramic material used were not highly pure, it would contain impurities of alkali ion. If a strain element were formed of such a ceramic material, the impurities would be mixed in strain sensors and degrade their characteristics at the time of despositing the strain sensors on the strain element and patterning them.

According to the present invention, the strain sensors and the leads are integrally formed with the strain element by thin film technology, so that force detecting devices of equal quality can be mass-produced easily. Since piezoresistive elements which have a gage factor one order or magnitude higher than that of metallic elements are employed as strain sensors, the resultant force detecting device can detect forces more accurately than force detecting devices using metallic strain sensors.

The gage factor of strain sensors made of a piezoresistive thin film is lower than the gage factor of semiconductor strain sensors. However, the piezoresistive strain sensors have advantages in that they require no temperature compensation circuit and no linearizer, thus simplifying the device and the circuit associated therewith. Where a strain element itself is formed of an insulative material such as ceramics, the manufacture of force detecting devices is more simplified inasmuch as the strain element is not required to be insulated.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
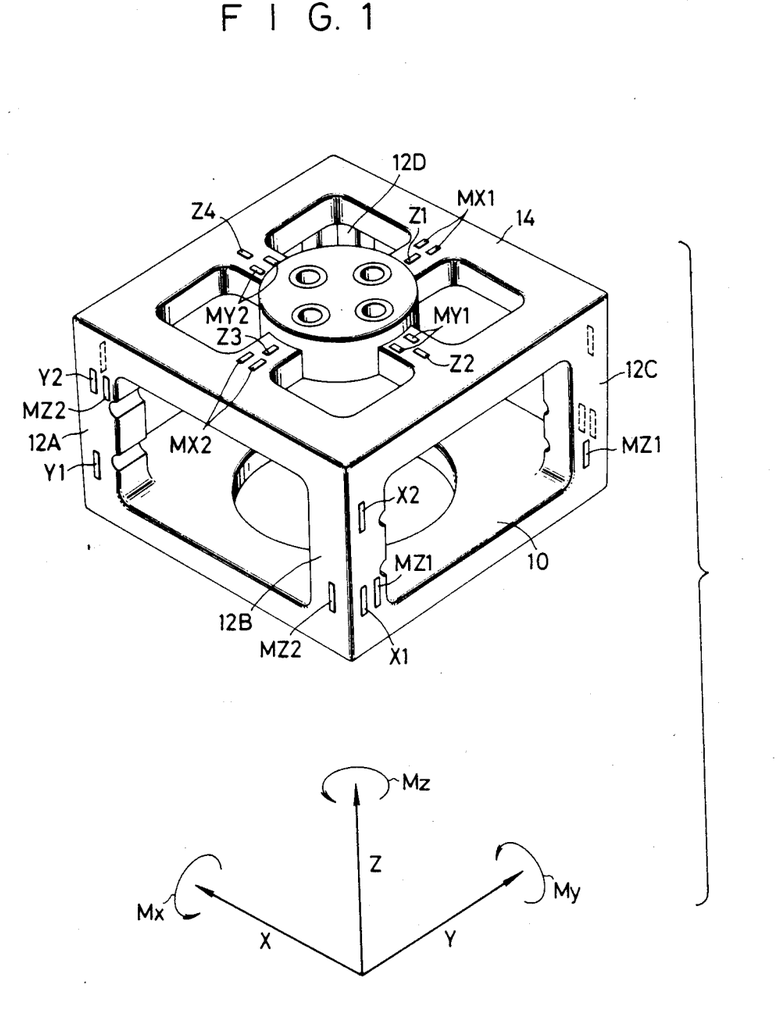
FIG. 1 is a perspective view of a force detecting device, showing the arrangement of an insulative strain element and strain sensors.

Various other objects, features and attendant advantages of the present invention will be more fully appreciated as the same becomes better understood from the following detailed description when considered in connection with the accompanying drawings in which like reference characters designate like or corresponding parts throughout the several views and wherein FIG. 1 shows a force detecting device according to the present invention. The force detecting device comprises an insulative strain element including a flat base 10, a plurality of vertical columns or beams 12A, 12B, 12C, 12D, and a cross-shaped diaphgram 14.

The insulative strain element is in the form of a structural body made of an aluminum alloy or stainless steel and coated with an electrically insulative material. The strain element requires electric insulation only with respect to strain sensors and their leads (described later). Therefore, the body of the strain element may be made of an electrically conductive material such as a metallic material, as described above, and its surface may be electrically insulated by an electrically insulative coating. Alternatively, the body of the strain element may itself be made of an electrically insulative material such as ceramics or the like.

In the embodiment shown in FIG. 1, the electrically insulative coating on the surface of the structural body of the strain element which is made of an aluminum alloy may be an inorganic insulating material such as $SiO_2$, $Al_2O_3$, $Si_3N_4$, $SiNxOy$, or the like, or an organic insulating material such as polyimide or the like.

A pattern including strain sensors and their leads is formed on the insulative strain element by thin film technology. The strain sensors are formed as piezoresistive thin films, and the leads are formed as highly conductive thin films.

The strain sensors are indicated at X1, X2, Y1, Y2, Z1, Z2, Z3, Z4, MX1, MX2, MY1, MY2, MZ1, MZ2 in FIG. 1. A predescribed number of strain sensors are also disposed on those surfaces of the beams 12B, 12C, 12D which are concealed from view in FIG. 1.

X, Y, and Z axes are established with reference to the force detecting device as shown in the lower portion of FIG. 1. The force detecting device is thus capable of detecting components FX, FY, FZ in the X, Y, Z directions of a force F applied to the force detecting device, and also components MX, MY, MZ of a moment M applied thereto. The strain sensors X1, X2 and the strain sensors X3, X4 (not shown in FIG. 1) serve to detect the force component FX, the strain sensors Y1, Y2, Y3, Y4 (Y3, Y4 not shown in FIG. 1) serve to detect the force component FY, and the strain sensors Z1, Z2, Z3, Z4 serve to detect the force component FZ.

The strain sensors MX1, MX2 serve to detect the moment component MX, whereas the strain sensors MY1, MZ1 serve to detect the moment components MY, MZ.

Figure 2:
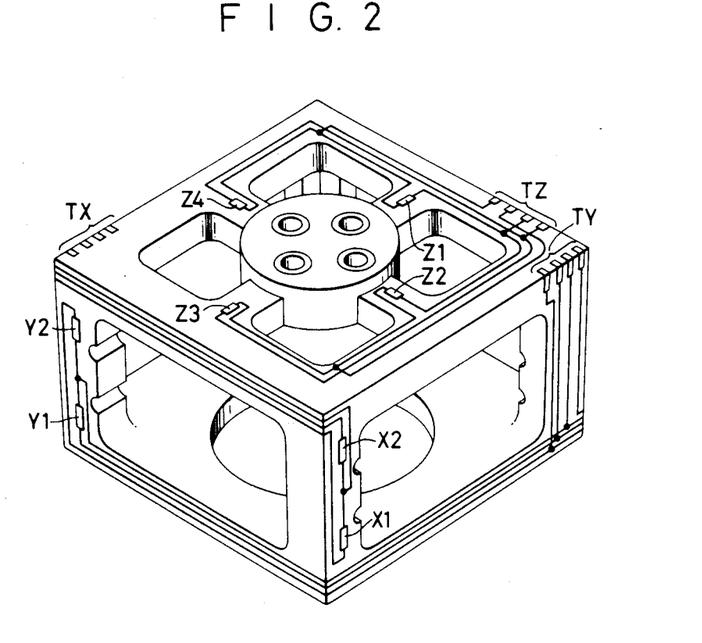
FIG. 2 is a perspective view showing strain sensors for detecting force components and their leads.

FIG. 2 shows the relationship between the leads and the strain sensors of FIG. 1. For the sake of brevity, however, only the strain sensors X1, X2, ... Z3, Z4 for detecting force components FX, FY, FZ and their leads are illustrated in FIG. 2. The leads of the strain sensor MX1 and other strain sensors which are omitted from illustration in FIG. 2 have portions overlapping the leads of the strain sensor X1 and other sensors, but such overlapping lead portions are electrically insulated from each other.

The leads comprise wires and terminal portions TX, TY, TZ. Each of the terminal portions TX, TY, TZ has four terminals, two for connection to a power supply and two for producing a detected output. The leads are formed as highly conductive thin films which are preferably made of aluminum, chromium, or nickel-chromium alloy, for example.

The principles of detecting the forces such as FX and the moments such as MX are well known and described in detail in various known documents. Here, only detection of the force components FX, FZ will briefly be described below.

FIG. 3(I) shows the force detecting device of FIG. 1 as viewed from above. The strain sensors MX1 and others for detecting the moment are omitted from illustration in FIG. 3(I).

The strain sensors X1, X2, X3, X4, Y1, Y2, Y3, Y4 are mounted on surfaces of the beams as shown in FIG. 3(I). The sensors X1, X2; X3, X4; Y1, Y2; Y3, Y4 are paired in succession in a direction normal to the sheet of FIG. 3(I). One of the sensors in each pair is concealed by the other from illustration, and those concealed sensors are denoted by the parenthesized reference characters.

Figure 3:
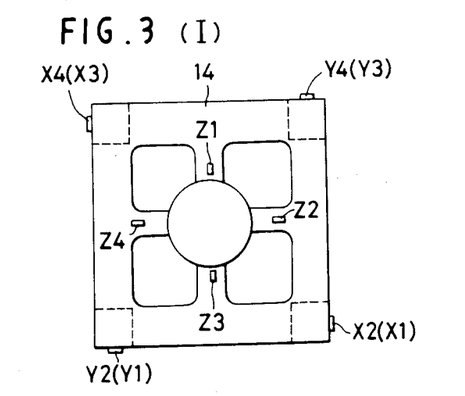
FIGS. 3 and 4 are views explaining force detection.

FIG. 3(II) shows the force detecting device as viewed from the side in FIG. 3(I), i.e., in the Y direction. The strain sensors Y1, Y2, Y3, Y4 are omitted from illustration in FIG. 3(II).

When a force FX in the X direction is applied to the force detecting device, the force detecting device is deformed as shown in FIG. 3(III). As the force detecting device is thus deformed, the strain sensors X1, X2, X3, X4 integrally mounted on the strain element are also strained. More specifically, the strain sensors X1, X4 are elongated, while the strain sensors X2, X3 are contracted.

The strain sensors X1 through X4 are electrically resistive bodies, and their electric resistances are equal to each other when the strain element is not strained. The strain sensors X1 through X4 are symmetrically positioned such that the absolute values of the amounts of elongation and contraction of the strain sensors X1 through X4 are equal to each other.

As shown in FIG. 3(IV), the strain sensors X1, X2, X3, X4 are interconnected by the leads as a Wheatstone bridge. The strain produced under the force FX applied to the strain element is detected as an output voltage V which is generated as a result of the changes in the resistances of the strain sensors X1 through X4. The Wheatstone bridge composed of the four strain sensors X1 through X4 for force detection can produce an output voltage that is four times the voltage which would be produced by a single strain sensor, and hence can detect an applied force with so much higher accuracy.

The force components FY, FZ as well as the force component FX and the moment components MX, MY, MZ are also detected by the corresponding strain sensors which are connected as Wheatstone bridges.

The force component FY can be detected in the manner identical to that described above for the detection of the force component FX.

Figure 4:
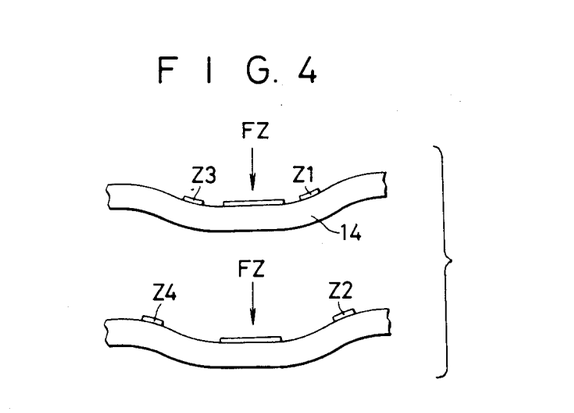

The force component FZ is detected as follows: As shown in FIG. 3(I), the strain sensors Z1, Z3 as paired and the strain sensors Z2, Z4 as paired are spaced from the center of the cross-shaped diaphragm 14 at different distances. Therefore, when the force FZ acts on the center of the cross-shaped diaphragm 14 to cause the diaphragm 14 to be deformed as shown in FIG. 4, the strain sensors Z1, Z3 are contracted and the strain sensors Z2, Z4 are elongated. The applied force FZ can be detected on the basis of the different modes of deformation of the strain sensors Z1 through Z4.

A method of manufacturing the force detecting device as shown in FIG. 1 will be described below.

A structural body shaped as shown in FIG. 1 is formed of an aluminum alloy, stainless steel, or the like.

Then, an electrically insulative material is coated as a thin layer on the surface of the structural body, thus producing an insulative strain element. It is also possible to construct a unitary strain element of an insulative material such as ceramics. In such a case, it is not necessary to coat the strain element with an insulative layer.

Then, a piezoresistive thin film is formed on the surface of the insulative strain element, and patterned according to a desired layout of strain sensors. This process can be carried by various methods, and some of such methods will be described later on.

A highly conductive thin film is thereafter formed and patterned according to a desired layout of leads, whereupon the force detecting device shown in FIG. 1 is produced.

The insulating layer, the piezoresistive thin film, and the highly conductive thin film are formed by thin film technology.

The patterning may be effected by photoetching which is well known in the art. Where photo CVD or ion beam depositing is employed, thin film formation and patterning can simultaneously be effected. That is, a thin film can be formed in a desired pattern by the photo CVD or ion beam depositing process.

Two well known methods of forming a thin film, i.e., photo CVD and plasma CVD, will be described below.

As a specific example, the structural body of a strain element is formed of an aluminum alloy, and a thin film of $Si_3N_4$ is deposited as an insulating layer on the structural body.

Figure 5:
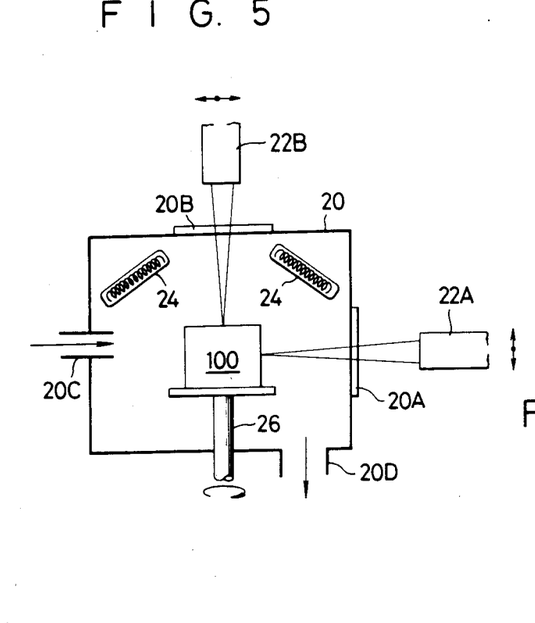
FIGS. 5 through 9 are views explaining a method of manufacturing a force detecting device.

FIG. 5 shows a device for effecting the photo CVD process. The device includes a chamber 20 in which a structural body 100 made of an aluminum alloy is placed on a stage 26. The chamber 20 is evacuated through an exhaust outlet 20D to a degree of vacuum ranging from 1 to 0.1 Torr, and $SiH_4$ and $NH_3$ are introduced as raw gasses into the chamber 20 through a gas inlet 20C. Light sources 22A, 22B (low-pressure mercury lamps capable of emitting light at a wavelength of 254 nm or 185 nm, or excimer lasers capable of emitting light at a wavelength of 193 nm) are energized to emit exciting light through windows 20A, 20B into the chamber 20. The raw gasses in the chamber 20 are now caused to react to deposit $Si_3N_4$ on the surface of the structural body 100 which has been heated to a temperature ranging from 200° to 300° C. by heating light sources 24. The deposited layer is uniformized by rotating the structural body 100 with the stage 26. When $Si_3N_4$ is deposited to a desired thickness on the structural body 100 thereby to form an insulating layer, an insulative strain element is completed. Mercury vapor is employed as a reaction accelerator for accelerating the reaction of the gasses in the chambers 20.

Figure 6:
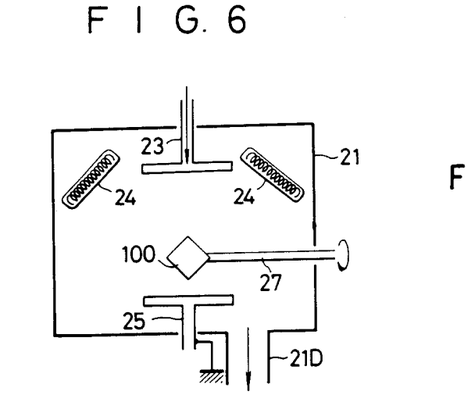

FIG. 6 shows a device for carrying out the plasma CVD method. The device includes a chamber 21, heating light sources 24, and electrodes 23, 25.

The chamber 21 is evacuated through an exhaust outlet 21D to a degree of vacuum ranging from 1 to 0.1 Torr, and raw gasses of $SiH_4$ and $NH_3$ are introduced into the chamber 21 through the electrode 23. A high-frequency electric field is developed at 13.56 MHz with power in the range of from 50 W to 200 W by the electrodes 23, 24 to generate a glow discharge in the chamber 21. The gasses in the chamber 21 are decomposed and reacted to deposit $Si_3N_4$ on a structural body 100 which has been heated to a temperature ranging from 200° to 300° C. by the heating light sources 24. The structural body 100 is supported by a holder 27 and rotated thereby to uniformize the deposition of $Si_3N_4$. An insulative strain element is completed when the deposited insulating layer of $Si_3N_4$ is formed as a thin film of desired thickness.

A piezoresistive thin film is then formed on the insulative strain element thus produced, and patterned according to a layout of strain sensors as illustrated in FIG. 1.

Thereafter, a highly conductive thin film is formed and patterned according to a layout of leads as shown in FIG. 1. When the leads are formed, the force detecting device as shown in FIG. 1 is finished.

There are known various patterning processes. The patterning process which employs well known photoetching as a general method will be described below with reference to FIGS. 7 and 8.

Figure 7:
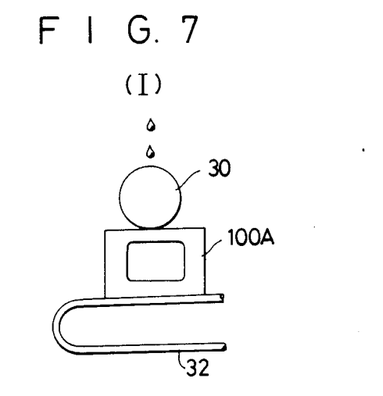

FIGS. 7(I) and 7(II) show an insulative strain element 100A on which a piezoresistive thin film or such a film and a highly conductive thin film are deposited. FIG. 7(I) is a front elevational view of the insulative strain element 100A, and FIG. 7(II) is a side elevational view of the insulative strain element 100A. Designated at 30 is a resist coating roller, and 32 conveyor wires.

Six outer side surfaces of the insulative strain element 100A are successively coated with a photoresist (sensitive to ultraviolet radiation) by the resist coating roller 30.

When a surface of the insulative strain element which has been coated with a photoresist is placed in contact with the conveyor wires 32, those areas of the surface which will be patterned are positionally adjusted out of direct contact with the conveyor wires 32, i.e., positioned in areas A, B shown in FIG. 7(II).

After the photoresist has uniformly been coated on all of the six outer surfaces of the strain element 100A, the photoresist is heated for pre-baking.

Figure 8:
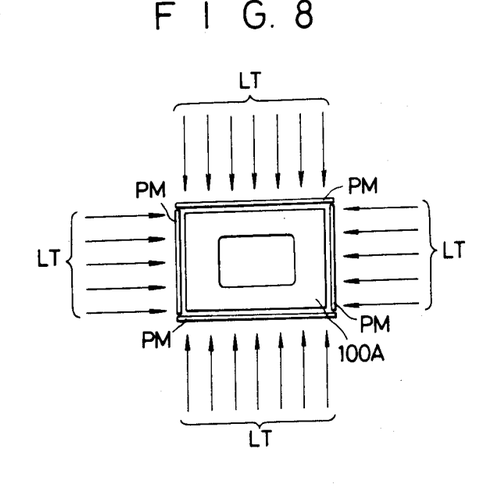
Figure 9:
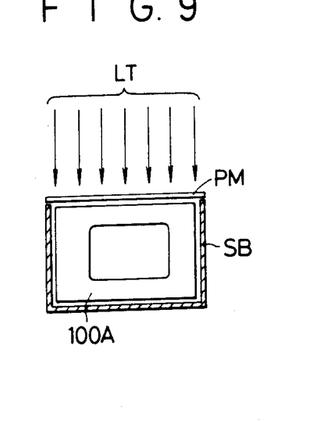

Subsequently, as shown in FIG. 8, photomasks PM having desired patterns, such for example as patterns of strain sensors or patterns of leads, are placed against the surfaces of the strain element 100A, which is then exposed to ultraviolet radiation LT. While in FIG. 8 all of the six outer surfaces of the strain element 100A are simultaneously exposed, one of the surfaces may be exposed at a time while shielding the other surfaces with light shielding members SB, and all of the surfaces may be successively exposed in this manner.

After the exposure, the photoresist is developed to produce a desired photoresist pattern (corresponding to a strain sensor pattern or a lead wire pattern), and then subjected to post-baking.

The thin film material is subsequently removed by etching, and thereafter the photoresist is removed by ashing or the like, whereupon the desired thin film pattern is obtained.

Certain specific examples will be described hereinbelow.

EXAMPLE 1

A structural body as shown in FIG. 1 was constructed of an aluminum alloy, and a thin film of $Si_3N_4$ was deposited thereon by the photo CVD device as shown in FIG. 5 according to the photo CVD method described with reference to FIG. 5, thus producing an insulative strain element.

A piezoresistive thin film was formed of a-Si on the surface of the insulative strain element. The thin film was deposited by the same device as the photo CVD device shown in FIG. 5 which has been described as forming a thin film of $Si_3N_4$. Only $SiH_4$ was introduced as a raw gas, and the thin film was formed under the same pressure, with the same exciting light, and at the same temperature as those employed in forming the thin film of $Si_3N_4$.

When the thin film of a-Si is formed, $PH_3$ or $B_2H_6$ may be used as a dopant gas to make the thin film negatively (n-type) or positively (p-type) conductive.

Thereafter, the a-Si thin film was etched by the photoetching process so as to be patterned according to a desired layout of strain sensors. Dry etching was effected with $CF_4$ used. A wet etching process using a mixture of HF, $HNO_3$, and $CH_3COOH$ may also be preferable for the etching of a-Si.

After the thin film was thus patterned, a thin film of aluminum was formed as a highly conductive thin film on the surface of the strain element by vacuum evaporation.

In the same way as the a-Si thin film was patterned, the aluminum film was patterned according to a layout of leads by the photoetching process, thus forming the leads. A force detecting device was thereby produced.

The highly conductive thin film may be formed by sputtering rather than vacuum evaporation, and may be made of any of various metallic materials such as Cr, NiCr, or their combination, rather than aluminum.

When the piezoresistive thin film is formed, exciting light may be applied as a light beam by the photo CVD device to scan a desired pattern of strain sensors, so that such a strain sensor pattern can be directly formed.

Furthermore, the highly conductive thin film may be formed by ion beam deposition so that it can be formed according to a desired pattern of leads.

In case such a scanning light beam and ion beam deposition are employed, it is not necessary to effect photoetching to obtain patterns of strain sensors and leads.

EXAMPLE 2

A structural body as shown in FIG. 1 was constructed of an aluminum alloy, and a thin film of $Si_3N_4$ was deposited thereon by the plasma CVD device as shown in FIG. 6 in the manner described with reference to FIG. 6, thus producing an insulative strain element.

An a-Si thin film was formed as a piezoresistive thin film on the surface of the insulative strain element by introducing only $SiH_4$ into the plasma CVD device, applying high-frequency power of 10 W (the suitable range being from 5 W to 100 W), heating the insulative strain element up to 250° C. (the suitable range being from 200° to 300° C.), and evacuating the chamber to 0.5 Torr (the suitable range being from 0.1 to 1 Torr).

At this time, $PH_3$ or $B_2H_6$ may be used as a dopant gas to make the thin film negatively (n-type) or positively (p-type) conductive.

Thereafter, the a-Si thin film was patterned by the photoetching process according to a desired layout of strain sensors. Subsequently, a highly conductive thin film was formed and patterned according to a layout of leads by the photoetching process in the same manner as EXAMPLE 1. A force detecting device was thereby produced.

EXAMPLE 3

A structural body as shown in FIG. 1 was constructed of an aluminum alloy, and an insulative film of polymide resin was deposited thereon by dipping, thus producing an insulative strain element.

A thin film of $\mu$c-Si:H was formed as a piezoresistive thin film on the surface of the insulative strain element by the plasma CVD process. $SiH_4$ was used as a raw gas, and $PH_3$ was used as a dopant gas, with $PH_3/SiH_4 = 3.000$ ppm. Therefore, the formed film of c-Si:H was doped with P.

The piezoresistive thin film was formed under a pressure of 0.4 Torr (the suitable range being from 0.1 to 1 Torr) with high-frequency power of 150 W (the suitable range being from 20 W to 500 W) at a temperature of 350° C. (the suitable range being from 250° to 400° C.). The thickness of the film was 8000 A.

Thereafter, the thin film was patterned by the photoetching process according to a desired layout of strain sensors. Subsequently, a pattern of leads was formed in the same manner as EXAMPLE 1, thus producing a force detecting device.

The thin film of c-Si:H in this example contains a mixture of two phases, i.e., a-Si and minute crystals of Si, and can also be fabricated by employing the photo CVD process.

EXAMPLE 4

A structural body was fabricated in the same manner as EXAMPLE 1, and a polysilicon (poly-Si) thin film was deposited thereon as a piezoresistive thin film by the plasma CVD process, the polysilicon being a multicrystalline form of silicon.

The polysilicon thin film was formed under the following conditions:

$SiH_4$ and $H_2$ were used as raw gasses and mixed at a ratio of $SiH_4/H_2 = 25\%$. The thin film was formed at a temperature of 300° C. under a pressure of 0.1 Torr with high-frequency power of 30 W/cm$^2$, the raw gasses being supplied at a flow rate of 100 sccm.

Preferable conditions under which a polysilicon thin film can be formed by the plasma CVD process are as follows:

$SiH_4/H_2 = 1\%$ to 50%. The temperature ranges from 250° C. to 300° C. The pressure ranges from 0.01 Torr to 0.5 Torr. The raw gas flow rate ranges from 1 sccm to 150 sccm. The high-frequency power ranges from 5 W/cm$^2$ to 50 W/cm$^2$.

The deposited polysilicon thin film was then patterned by photoetching, and then leads were formed in the same manner as EXAMPLE 1, thereby producing a force detecting device.

The polysilicon thin film may also be formed by some other processes than the plasma CVD process. Typical such processes and their conditions will be described below:

(I) LPCVD process (low-pressure CVD process):

The raw gas mixture ratio $SiH_4/H_2 = 10$ to 50%. The temperature ranges from 650° C. to 700° C. The pressure ranges from 0.01 Torr to 1.0 Torr. The raw gas flow rate ranges from 100 sccm to 300 sccm.

(II) Laser annealing process:

The annealing process is a method of converting amorphous Si to a multicrystalline form by means of annealing in a short period of time.

Conditions for forming a polysilicon thin film in the laser annealing process are that the laser power ranges from 5 W to 20 W, the diameter of a laser beam ranges from 50 to 400 micrometers, the speed of scanning ranges from 1 to 100 cm/sec (in the X direction) and is 100 micrometers/sec (in the Y direction), and the temperature of the strain element ranges from 100° C. to 200° C. (in the atmosphere of $N_2$).

(III) Electron beam annealing process:

Conditions for forming a polysilicon thin film in the electron beam annealing process are that the beam current is up to 2 mA, the acceleration voltage is up to 12 KV, the speed of scanning ranges from 1 to 100 cm/sec, the width of scanning is up to 500 micrometers, and the diameter of an electron beam is up to 100 micrometers.

(IV) Lamp annealing process:

Conditions for forming a polysilicon thin film in the lamp annealing process are that the strain element is heated to a temperature ranging from 800° to 1100° C. for a time period ranging from 1 to 100 seconds in an atmosphere of $N_2$ or Ar. The temperature rises at a rate of 100°C./sec. The same etchant as that for a-Si may be used for both $\mu$c-Si and poly-Si.

Piezoresistive thin films of a-Si, $\mu$c-Si, and poly-Si which constitute strain sensors have been described above. The strain sensors made of a-Si, $\mu$c-Si, and poly-Si have gage factors which are one order of magnitude higher than those of conventional metallic strain sensors.

The gate factor G of the a-Si strain sensor is about $\pm 40$ (+ indicates the p-type and − indicates the n-type). The gage factor G of the $\mu$c-Si strain sensor is about $\pm 50$. The gage factor G of the poly-Si strain sensor is about $\pm 60$.

EXAMPLE 5

A strain element as shown in FIG. 1 was formed by sintering highly pure alumina. Then, strain sensors were formed on the surface of the strain element by a piezoresistive thin film of a-Si, and leads were formed thereon by a highly conductive thin film of aluminum in the same manner as EXAMPLE 1, thus producing a force detecting device.

In the formation of the strain element, alumina was sintered at a temperature of 1800° C. for 1.5 hours. The preferable time range for sintering alumina under the above temperature is from 1 to 2 hours.

Figure 10:
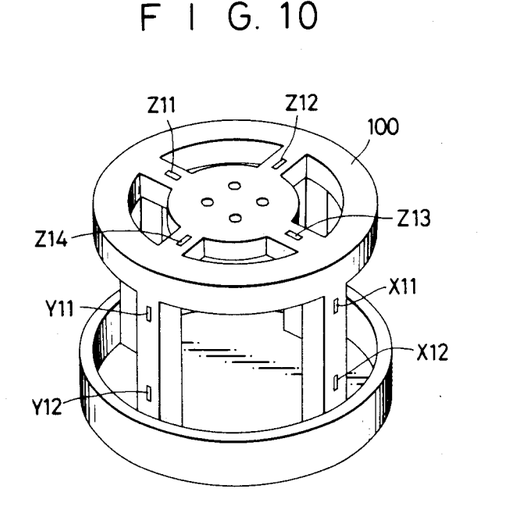
FIG. 10 is a perspective view of another force detecting device of a configuration different from that of FIG. 1, illustrating the arrangement of strain sensors.

FIG. 10 shows a force detecting device 100 according to another embodiment of the present invention. Denoted in FIG. 10 by X11, X12, Y11, Y12, Z11, Z12, Z13, Z14 are strain sensors. Wiring leads are omitted from illustration in FIG. 10 for clarity. Various known force detecting devices may be implemented in the form of a force detecting device of the present invention.

For forming strain sensors and leads on an insulative strain element, a piezoresistive thin film such for example as a thin film of amorphous silicon may first be deposited on the surface of the strain element, then patterned in the shape of a prescribed layout of the strain sensors, and thereafter a highly conductive thin film may be deposited and patterned in the shape of a layout of leads.

Although certain preferred embodiments have been shown and described, it should be understood that many changes and modifications may be made therein without departing from the scope of the appended claims.

What is claimed is:

1. A force detecting device comprising:
   an insulative strain element having a metallic structural body and a surface with an insulation on the surface;
   strain sensors and leads disposed as thin film patterns on said insulative strain element integrally therewith; and
   said strain sensors being formed of a piezoresistive thin film and said leads being formed of a highly conductive thin film.

2. A force detecting device according to claim 1, wherein said insulation comprises an electrically insulating material coated on the surface of said metallic structural body.

3. A force detecting device according to claim 1, wherein said insulation comprises an electric insulation.

4. A force detecting device according to claim 1, wherein said piezoresistive thin film is made of a material selected from the group consisting of a-Si, μc-Si, poly-Si, a-Ge, μc-Ge, and an amorphous silicon alloy.

5. A force detecting device according to claim 1, wherein said highly conductive thin film is made of a material selected from the group consisting of aluminum, chrome, and a nickel-chrome alloy.

6. A force detecting device comprising:
   an insulative strain element which is made of a ceramic insulative material;
   strain sensors and leads disposed as thin film patterns on said insulative strain element integrally therewith; and
   said strain sensors being formed of a piezoresistive thin film and said leads being formed of a highly conductive thin film.

7. A force detecting device according to claim 6, wherein said piezoresistive thin film is made of a material selected from the group consisting of a-Si, μc-Si, poly-Si, a-Ge, μc-Ge, and an amorphous silicon alloy.

8. A force detecting device according to claim 6, wherein said highly conductive thin film is made of a material selected from the group consisting of aluminum, chromium, and a nickel-chromium alloy.

* * * * *